United States Patent
Nelson

(10) Patent No.: US 6,843,509 B2
(45) Date of Patent: Jan. 18, 2005

(54) COUPLER FOR USE WITH METAL CONDUITS

(75) Inventor: Bruce I. Nelson, Colville, WA (US)

(73) Assignee: Colmac Coil Manufacturing, Inc., Colville, WA (US)

( * ) Notice: Subject to any disclaimer, the term of this patent is extended or adjusted under 35 U.S.C. 154(b) by 61 days.

(21) Appl. No.: 10/308,297

(22) Filed: Dec. 2, 2002

(65) Prior Publication Data

US 2004/0104574 A1 Jun. 3, 2004

(51) Int. Cl.$^7$ .................. F16L 13/02; B23K 20/08
(52) U.S. Cl. .................. 285/288.11; 285/148.12; 285/329; 228/107; 428/651
(58) Field of Search ............ 285/148.11, 148.12, 285/288.1, 288.11, 329; 228/107, 108, 109; 428/651

(56) References Cited

U.S. PATENT DOCUMENTS

| | | | |
|---|---|---|---|
| 1,926,517 A | * | 9/1933 | Filippi et al. .............. 285/21.1 |
| 2,209,325 A | * | 7/1940 | Dennis ....................... 285/300 |
| 3,137,937 A | | 6/1964 | Cowan et al. |
| 3,233,312 A | | 2/1966 | Cowan et al. |
| 3,264,731 A | | 8/1966 | Chudzik |
| 3,397,444 A | | 8/1968 | Bergmann et al. |
| 3,583,062 A | | 6/1971 | Sharp, Jr. et al |
| 3,583,064 A | * | 6/1971 | Costello et al. ............. 228/107 |
| 3,689,232 A | * | 9/1972 | Nobuyoshi et al. ......... 428/651 |
| 3,798,010 A | | 3/1974 | Sharp, Jr. et al. |
| 3,798,011 A | | 3/1974 | Sharp, Jr. et al |
| 3,876,136 A | * | 4/1975 | Bomberger, Jr. ........ 285/148.12 |
| 3,910,478 A | | 10/1975 | Howell et al. |
| 4,010,965 A | * | 3/1977 | Izuma et al. ................ 428/651 |
| 4,231,506 A | | 11/1980 | Istvanffy et al. |
| 4,496,096 A | * | 1/1985 | Persson ...................... 228/107 |
| 4,702,406 A | * | 10/1987 | Sullivan et al. ............. 228/200 |
| 4,981,250 A | | 1/1991 | Persson |
| 4,988,130 A | * | 1/1991 | Obara et al. ................ 285/328 |
| 5,213,904 A | * | 5/1993 | Banker ....................... 428/651 |
| 5,836,623 A | | 11/1998 | Bothell et al. |
| 5,975,590 A | * | 11/1999 | Cowan et al. ......... 285/133.11 |

* cited by examiner

Primary Examiner—James M. Hewitt
(74) Attorney, Agent, or Firm—Wells St. John P.S.

(57) ABSTRACT

A coupler for joining an aluminum conduit to a steel or stainless steel conduit and which includes a main body which is formed from a first layer of aluminum and a layer of steel or an iron-chromium alloy which are explosively welded together, and wherein the main body has a first aluminum surface, and an opposite, second steel or iron-chromium alloy surface, and wherein the aluminum conduit is welded to the first aluminum surface, and the steel or stainless steel conduit is welded to the second steel or iron-chromium surface.

4 Claims, 3 Drawing Sheets

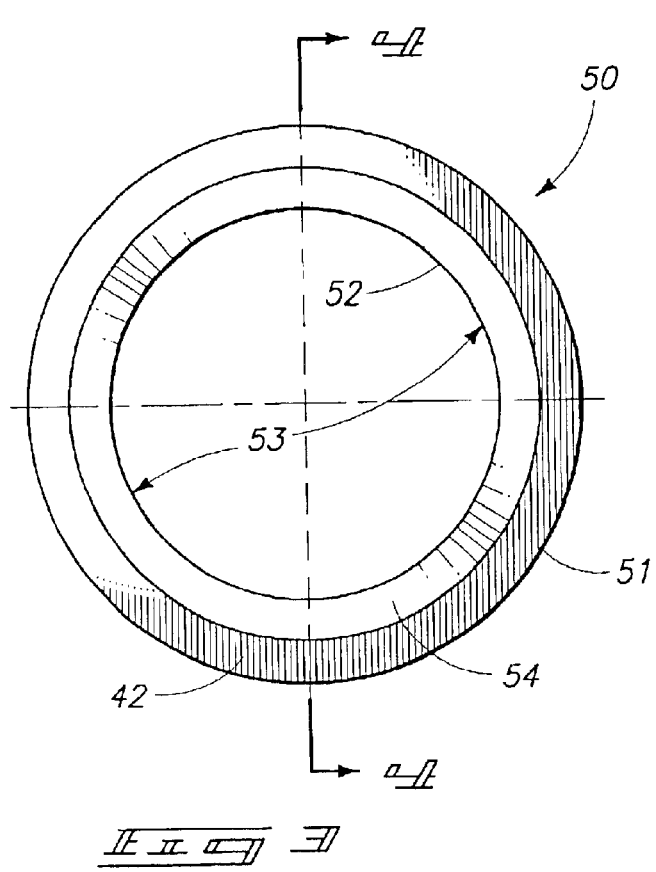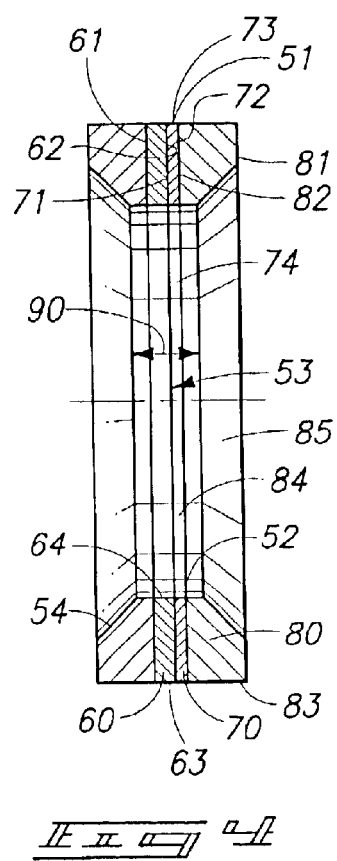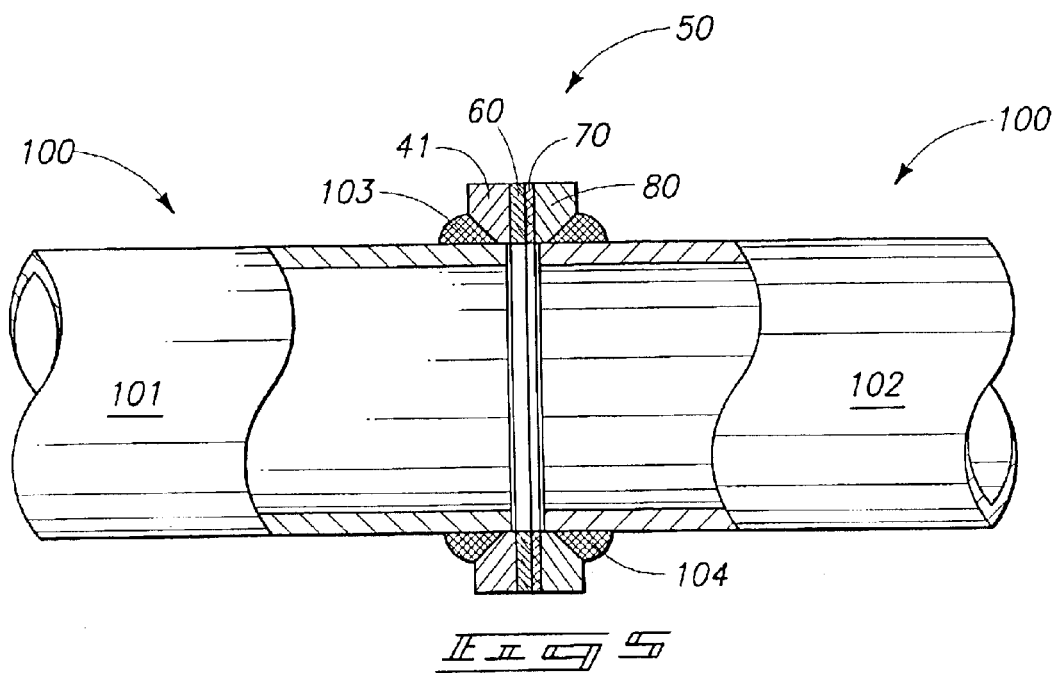

COUPLER FOR USE WITH METAL CONDUITS

TECHNICAL FIELD

The present invention relates to a coupler for use with metal conduits, and more specifically to a coupler which permits an aluminum conduit, and a steel or iron-chromium alloy conduit to be welded together.

BACKGROUND OF THE INVENTION

In various commercial and industrial applications, it is often necessary for conduits fabricated from different metals such as aluminum and steel to be joined together in fluid-flowing relation. For example, in refrigeration applications, aluminum heat exchangers are often employed because of their light weight, high thermal conductivity and good corrosion resistance as well as their low cost. Aluminum has often been selected for use in the fabrication of these heat exchangers because of their compatibility with ammonia which is a commonly used refrigerant in large industrial refrigeration systems.

Refrigerant piping in these large refrigerant systems is often fabricated from carbon steel or an iron-chromium alloy (stainless steel). In installations of this type means must be provided for connecting the aluminum heat exchangers or conduits coupled to same to the carbon steel, or stainless steel refrigerant piping. Heretofore, bolted flange union joints having dielectric gaskets and washers have been used to make these fluid coupling connections. An example of a prior art flange union joint is seen in FIG. 1.

While these bolted, flange union joints have operated with some degree of success, there are several shortcomings which have detracted from their usefulness. For example, typical dielectric bolted flange union joints usually consist of a number of parts including flanges, bolts, nuts, washers, gaskets, and electrically insulative sleeves. Such joints are typically expensive and are labor intensive to assemble and install due to the numerous parts which comprise same. During installation, and as seen in FIG. 1, the flange union joint must be aligned in a given orientation relative to a gasket to facilitate the proper seating of the gasket and substantially leak-free operation of the joint. The assembly procedure is somewhat complicated and involves a gradual tightening and torquing of a plurality of different bolts in a given pattern. In addition to the difficulties in installing such joints, dielectric flange union joints tend to leak over time due in part to the aging of gaskets; the loosening of bolts due to thermal expansion and contraction; and the misalignment and movement of conduits relative to the joint. Those skilled in the art will recognize that refrigerant and coolant leaks occasioned by the partial or complete failures of these flange union joints can create safety risks; damage to the surrounding equipment or environment; or loss of refrigerant system capacity.

A coupler for joining an aluminum conduit to a steel or stainless steel conduit which addresses these and other perceived shortcomings in the prior art practices is the subject matter of the present application.

SUMMARY OF THE INVENTION

A first aspect of the present invention relates to a coupler for joining an aluminum conduit to a steel or stainless steel conduit, and which includes, a main body which is formed from a first layer of aluminum and a layer of steel or an iron-chromium alloy and which are explosively welded together, and wherein the main body has a first aluminum surface, and an opposite, second steel or iron-chromium alloy surface, and wherein the aluminum conduit is welded to the first aluminum surface, and the steel or stainless steel conduit is welded to the second steel or iron-chromium surface.

Another aspect of the present invention relates to a coupler for joining an aluminum conduit to a steel or stainless steel conduit and which includes, a first aluminum layer having a first hardness, and which has an outwardly facing surface; a second aluminum layer having a second hardness which is less than the first hardness, and which is juxtaposed relative to the first aluminum layer; a third titanium layer juxtaposed relative to the second aluminum layer; and a fourth steel or iron-chromium alloy layer which has an outwardly facing surface and which is juxtaposed relative to the third titanium layer, and wherein the respective layers are explosively welded together to form a ring shaped main body, and wherein the aluminum conduit is welded to the outwardly facing surface of the first aluminum layer, and the steel or stainless steel conduit is welded to the outwardly facing surface of the fourth steel or iron-chromium alloy layer.

Yet another aspect of the present invention relates to a coupler for joining an aluminum conduit to a steel or stainless steel conduit and which includes, a substantially ring shaped first aluminum layer which has a first hardness and which further has a beveled substantially circumscribing peripheral edge, a first thickness dimension, and a second wall thickness dimension; a substantially ring shaped second layer of aluminum which has a second hardness that is less than the first hardness, and which further has a second wall thickness dimension which is substantially equal to the second wall thickness dimension of the first layer of aluminum, and a first thickness dimension which is less than the first thickness dimension of the first layer of aluminum; a substantially ring shaped third layer of titanium juxtaposed relative to the second layer of aluminum, and which has a second wall thickness dimension which is substantially equal to the second wall thickness dimension of the second layer of aluminum, and a first thickness dimension which is less than the first thickness dimension of the second layer of aluminum; and a substantially ring shaped fourth layer of steel or an iron-chromium alloy juxtaposed relative to the third layer of titanium, and which has a second wall thickness dimension which is substantially equal to the second wall thickness dimension of the third titanium layer, and a first thickness dimension which is substantially equal to the first thickness dimension of the first aluminum layer, and wherein the fourth layer of steel or iron-chromium alloy has a beveled, substantially circumscribing and outwardly facing peripheral edge, and wherein the respective layers are explosively welded together to form a ring shaped main body which has a throat having a dimension which extends between the beveled substantially circumscribing peripheral edges of the first and fourth layers, and wherein the respective aluminum and steel conduits each have a wall thickness, and wherein the dimension of the throat is at least equal to the wall thickness dimension of one of the aluminum or steel conduits, and wherein the aluminum conduit is welded to the peripheral edge of the first aluminum layer, and the steel or stainless steel conduit is welded to the peripheral edge of the fourth steel or iron-chromium alloy layer.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 3 is an end view of the coupler of the present invention.

FIG. 4 is a somewhat exaggerated sectional view of the coupler of the present invention and which is taken from a position along line 4—4 of FIG. 3.

FIG. 5 is an environmental, partial, longitudinal sectional view showing the coupler of the present invention joining adjacent conduits.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
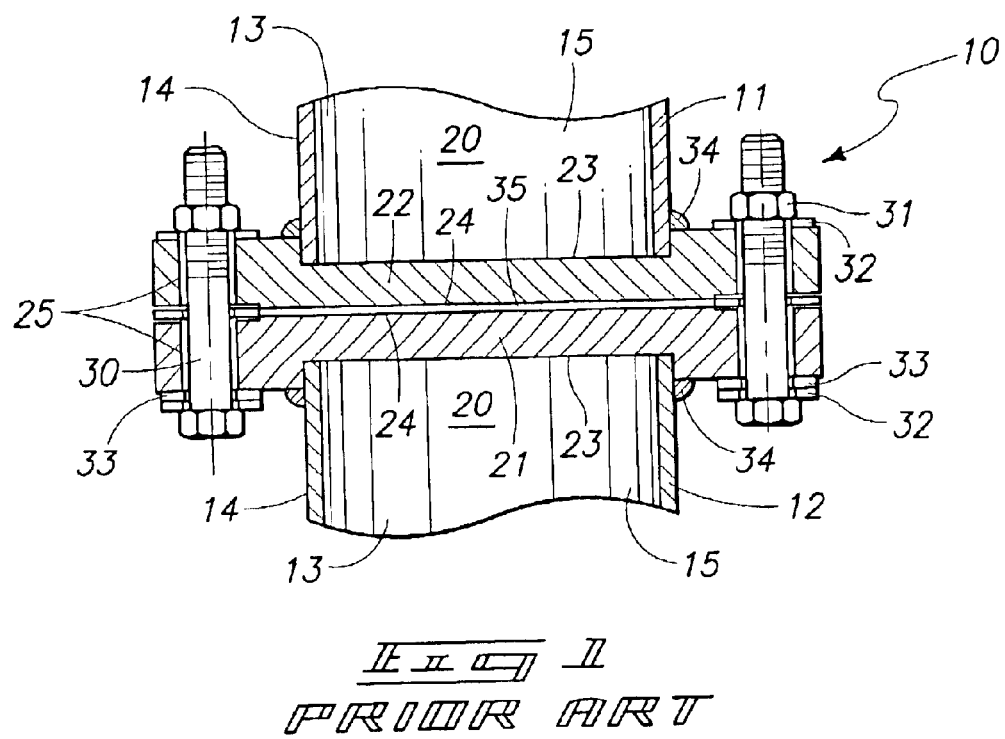
FIG. 1 is a longitudinal, sectional view taken through a typical prior art flange union joint assembly.

Referring now to FIG. 1, a prior art flange union joint for joining metal conduits is shown. As seen therein, the prior art flange union joint, which is generally indicated by the numeral 10, is operable to join a steel or stainless steel conduit 11 and an aluminum conduit 12 in fluid flowing relation one relative to the other. Each of the conduits 11 and 12 have a circumscribing wall 13 which is defined by an outwardly facing service 14 and an opposite inwardly facing surface 15. The inwardly facing surface 15 defines a fluid passageway 20. As seen in FIG. 1, the flange union joint 10 is operable to orient or otherwise position the respective conduits 11 and 12 in substantially coaxial alignment, one relative to the other. The flange union joint 10 includes a first flange member 21 and an opposite second flange member 22. Each of the flange members define a flange seat 23, and an opposite flange face 24. The flange faces are disposed in substantially adjacent or juxtaposed relation one relative to the other when properly assembled. As illustrated in FIG. 1, the respective first and second flanges 21 and 22 have a plurality of bolt apertures 25 which are formed about their respective peripheral edges. When properly oriented, the bolt apertures 25 of one of the flanges are substantially coaxially aligned with the bolt apertures formed in the opposite flange member. As seen in FIG. 1, the flange union joint includes a plurality of bolts 30 which are received through the coaxially aligned bolt apertures, and which threadably mate with corresponding nuts 31. Still further, the bolts receive several washers 32. A hole liner 33 is typically received in each of the bolt apertures 25 which are formed in one of the first or second flanges 22, and the bolts 30 are slidably received in the respective hole liners 33. As will be appreciated, the first and second flanges 21 and 22 are fabricated from materials which permits the conduit attached to same to be fusion welded in place. As seen in FIG. 1, a welded bead 34 secures the respective conduits to the adjacent first or second flange members as appropriate. Separating the respective flange faces 24, one from the other, is a dielectric gasket 35.

As discussed earlier in this application, a flange union joint 10, such as shown in FIG. 1, can quickly become loose and leak under large temperature cycling which is attendant with such applications as in large scale refrigeration systems. Still further, these same assemblies are difficult to install inasmuch as there are a large number of parts, and still further, parts of these same flange union joints 10 may corrode or deteriorate over time. For example, if a dielectric gasket 35 breaks down this can lead to galvanic corrosion on the aluminum side 12 of the flange union joint 10.

Figure 2:
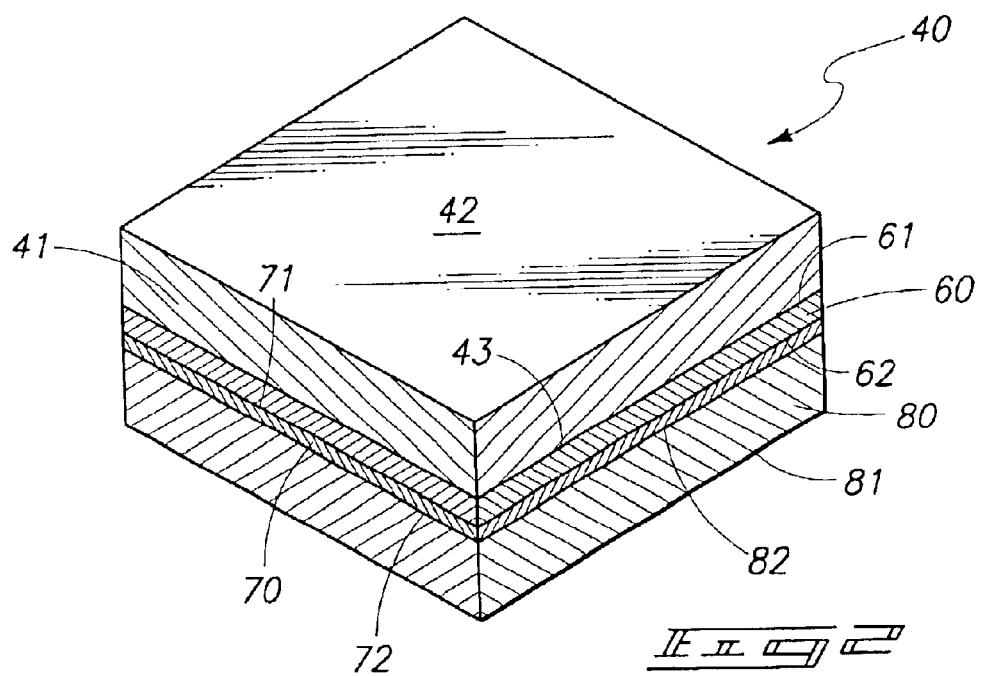
FIG. 2 is a somewhat exaggerated perspective view of an explosively welded metal stack from which a coupler of the present invention is fabricated.

Referring now to FIG. 2, an explosion welded plate is generally indicated by the numeral 40, and is fabricated from a plurality dissimilar metal layers. As seen in FIG. 2, a first layer of aluminum 41 which has a first hardness is provided. A suitable aluminum or aluminum alloy for the first layer 41 is 6061-T6 aluminum. The first layer 41, has a thickness dimension of about 0.5 inches, and further has a first outwardly facing surface 42 and an opposite, second, or inwardly facing surface 43.

As seen in FIGS. 3 and 4, a coupler 50 of the present invention is machined from the explosion welded plate 40 as illustrated in FIG. 2. The coupler 50 has a third outwardly facing and circumscribing surface 51. This outwardly facing surface 51 defines an outside diametral dimension. Still further, the coupler has an opposite, fourth inwardly facing surface 52 which defines a fluid passageway 53. As seen in FIGS. 3 and 4, a beveled, substantially circumscribing peripheral edge 54 is machined into the first or outwardly facing surface 42. The first layer of aluminum 41 is formed into a ring-like shape which has a wall thickness which is measured between the circumscribing sidewall surface 51, and the inwardly facing surface 52. In this regard, the wall thickness dimension which is selected is greater than the wall thickness of the aluminum conduit which will be welded to same. This aluminum conduit will be discussed in greater detail hereinafter. Still further the beveled and peripheral edge 54 causes the wall thickness to be variable in that same region of the first aluminum layer 41.

Again referring to FIG. 2, the explosion welded plate 40 further includes a second layer of aluminum which is generally indicated by the numeral 60. This second layer of aluminum 60 has a second hardness which is less than the hardness of the first aluminum layer 41. A suitable second layer of aluminum can be fabricated from 6061-0 type aluminum. The second layer of aluminum has a thickness dimension of about 0.02 inches to about 0.06 inches. The second layer of aluminum 60 has a first interface surface 61 which is juxtaposed relative to the inwardly facing surface 43 of the first aluminum layer 41. Still further the second layer of aluminum 60 has a second interface surface 62. When machined into the coupler 50 as seen in FIGS. 3 and 4, the second layer of aluminum 60 has an outwardly facing circumscribing surface 63, and an opposite inwardly facing surface 64 which defines in part the passageway 53. As illustrated in FIG. 3, the outside facing surface 63 defines an outside diametral dimension which is substantially equal to the outside diametral dimension of the first layer of aluminum 41. Still further the inside facing surface defines an inside diametral dimension which is substantially equal to the inside diametral dimension as defined by the inwardly facing surface 52.

Referring again to FIG. 2, it will be seen that the explosion welded plate 40 has a third layer of titanium which is generally indicated by the numeral 70. The third layer of titanium 70 has a thickness dimension of about 0.012 inches to about 0.02 inches. This third layer of titanium can be formed from an annealed titanium. The third layer of titanium 70 has a first interface surface 71, which is juxtaposed relative to the second interface surface 62 of the second layer of aluminum 60, and an opposite second interface surface 72. When machined into the coupler 50 as seen in FIGS. 3 and 4, the third layer of titanium has an outwardly facing and circumscribing surface 73 and which defines an outside diametral dimension which is substantially similar to the outside diametral dimension of the second layer of aluminum 60. The third layer of titanium has an opposite, inside facing surface 74 defining an inside diametral dimension which is substantially equal to the inside diametral dimension as defined by the second layer of aluminum 60.

Referring again to FIG. 2, it will be seen that the explosion welded plate 40 includes a fourth layer of steel or an iron-chromium alloy which is generally indicated by the numeral 80. The fourth layer of steel has a thickness dimension which is substantially identical to the thickness dimension of the first layer of aluminum 41, that is, about 0.50 inches. The fourth layer of steel or an iron-chromium alloy 80 has a first outwardly facing surface 81 and a second inwardly facing surface 82. When machined into the coupler 50, as seen in FIGS. 3 and 4, the fourth layer of steel or an iron-chromium alloy 80 has a third outwardly facing and circumscribing surface 83, and which defines an outside diametral dimension which is substantially identical to the third layer of titanium 70; and further has a fourth inwardly facing surface 84 which defines an inside diametral dimension which is substantially equal to the inside diametral dimension of the third layer of titanium 70. As seen, the inwardly facing surface 84 defines, in part, the passageway 53. In a manner similar to the first layer of aluminum 41, the fourth layer of steel or an iron-chromium alloy 80 has a beveled peripheral edge 85. As best seen by reference to FIG. 4, a throat 90, having a dimension, extends between the beveled substantially circumscribing peripheral edges of the first and fourth layers 41 and 80, respectively. In the embodiment as shown, it should be understood that the respective aluminum and steel conduits, which will be discussed hereinafter, each have a wall thickness, and the dimension of the throat is at least equal to the wall thickness of at least one of the aluminum or steel conduits.

Referring now to FIG. 5, the coupler 50 of the present invention is shown in a cross-sectional view and where it couples a pair of conduits 100 in fluid flowing relation one relative to the other. In this regard, the conduits 100 comprise a first aluminum conduit 101, having a first wall thickness and a second steel or stainless steel conduit 102 having a second wall thickness. Typically, while the outside diametral dimension of the respective conduits 100 are approximately the same size, the wall thicknesses of the respective conduits may vary. As should be appreciated, the aluminum conduit 101 is received in the passageway 53 or throat 90 and is secured to the first layer of aluminum 41 by way of a suitable fusion weld bead 103. Still further, the steel or stainless steel conduit 102 is received in the passageway 53 or throat 90 and is disposed in spaced relation relative to the aluminum conduit 101 in order to provide a gap or space which will allow for the thermal expansion of the respective conduits 100. The steel or stainless steel conduit 102 is attached or otherwise affixed in an appropriate fashion by means of a fusion welded bead 104 to the fourth layer of steel or an iron-chromium alloy 80.

Figure 6:
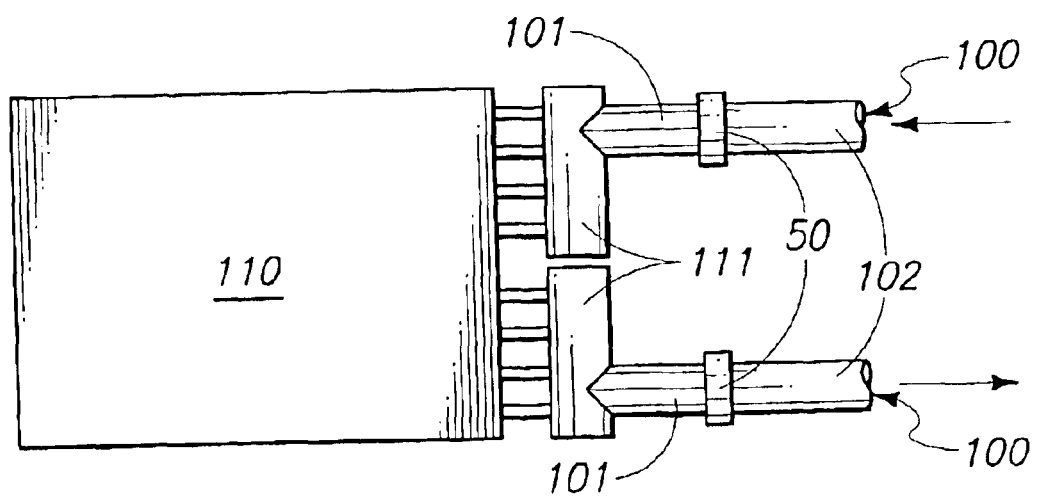
FIG. 6 is a schematic view of the coupler of the present invention utilized in combination with a heat exchanger and associated fluid delivery conduits.

Referring now to FIG. 6, the present invention is shown in use with respect to a heat exchanger or other vessel 110 which is fabricated from aluminum. In this regard, the heat exchanger or other vessel 110 is disposed in fluid flowing relation relative to aluminum manifolds which are generally indicated by the numeral 111. Coupled in fluid flowing relation, and extending outwardly relative to the respective manifolds 111 are the aluminum conduits 101 as illustrated in FIG. 5. The coupler 50 is shown affixed to the aluminum conduit 101 in the fashion as shown in FIG. 5. Still further, a steel or stainless steel conduit 102 is coupled to the fourth layer 80 of the coupler and extends outwardly and in fluid flowing relation relative thereto.

Operation

The operation of the described embodiment of the present invention is believed to be readily apparent and is briefly summarized at this point.

A coupler 50 for joining an aluminum conduit 101 to a steel or stainless steel conduit 102 is shown in FIGS. 5 and 6 respectively. In this regard, the coupler 50 includes a substantially ring shaped first aluminum layer 41 which has a first hardness, and which further has a beveled substantially circumscribing peripheral edge 54, a first thickness dimension, and a second wall thickness dimension. A substantially ring shaped second layer of aluminum 60 is provided, and which has a second hardness that is less than the first hardness, and which further has a second wall thickness dimension which is substantially equal to the second wall thickness dimension of the first layer of aluminum 41. Still further, the substantially ring shaped second layer of aluminum 60 has a first thickness dimension which is less than the first thickness dimension of the first layer of aluminum. A substantially ring shaped third layer of titanium 70 is provided and which is juxtaposed relative to the second layer of aluminum 60 and which has a second wall thickness dimension which is substantially equal to the second wall thickness dimension of the second layer of aluminum 60. Still further, the third layer of titanium 70 has a first thickness dimension which is less than the first thickness dimension of the second layer of aluminum 60. The coupler 50 further has a substantially ring shaped fourth layer of steel or an iron-chromium alloy 80 juxtaposed relative to the third layer of titanium 70. The fourth layer of steel or an iron-chromium alloy 80 has a second wall thickness dimension which is substantially equal to the second wall thickness dimension of the third titanium layer 70, and a first thickness dimension which is substantially equal to the first thickness dimension of the first aluminum layer 41. The fourth layer of steel or iron-chromium alloy has a beveled, substantially circumscribing and outwardly facing peripheral edge 85. The respective layers are explosively welded together to form a ring shaped main body which has a throat 90 having a dimension which extends between the beveled substantially circumscribing peripheral edges 54 and 85 of the first and fourth layers. The respective aluminum and steel or stainless steel conduits 101 and 102 each have a wall thickness, and wherein the dimension of the throat 90 is at least equal to the wall thickness of at least one of the aluminum or steel or stainless steel conduits, or twice the wall thickness dimension of the aluminum conduit 101. As seen in FIG. 5, the aluminum conduit 101 is welded to the peripheral edge 54 or first outwardly facing surface 42, and the steel or stainless steel conduit 102 is welded to the peripheral edge 85 or outwardly facing surface 81 of the fourth steel or iron-chromium alloy layer 80. As will be recognized from the drawings, the first and fourth layers 41 and 80 have substantially identical thickness dimensions. Still further, the thickness dimension of the first aluminum layer 41 is greater than the thickness dimension of the second aluminum layer 60. Still further, the thickness dimension of the second aluminum layer 60 is greater than the thickness dimension of the third titanium layer 70.

Therefore, the present invention provides a coupler 50 which is operable to conveniently join aluminum and steel or stainless steel conduits in fluid flowing relation in a manner not possible heretofore. The present invention further avoids the shortcomings in the prior art practice which includes the use of flange union joints having a multiplicity of parts and which have a propensity to fail with the passage of time.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A coupler for joining an aluminum conduit to a steel or stainless steel conduit, comprising:

a substantially ring shaped first aluminum layer which has a first hardness and which further has a beveled substantially circumscribing peripheral edge, a first thickness dimension, and a second wall thickness dimension;

a substantially ring shaped second layer of aluminum which has a second hardness that is less than the first hardness, and which further has a second wall thickness dimension which is substantially equal to the second wall thickness dimension of the first layer of aluminum, and a first thickness dimension which is less than the first thickness dimension of the first layer of aluminum;

a substantially ring shaped third layer of titanium juxtaposed relative to the second layer of aluminum and which has a second wall thickness dimension which is substantially equal to the second wall thickness dimension of the second layer of aluminum, and a first thickness dimension which is less than the first thickness dimension of the second layer of aluminum; and a substantially ring shaped fourth layer of steel or an iron-chromium alloy juxtaposed relative to the third layer of titanium, and which has a second wall thickness dimension which is substantially equal to the second wall thickness dimension of the third titanium layer, and a first thickness dimension which is substantially equal to the first thickness dimension of the first aluminum layer, and wherein the fourth layer of steel or iron-chromium alloy has a beveled, substantially circumscribing and outwardly facing peripheral edge, and wherein the respective layers are explosively welded together to form a ring shaped main body which has a throat having a dimension which extends between the beveled substantially circumscribing peripheral edges of the first and fourth layers, and wherein the respective aluminum and steel or stainless steel conduits each have a wall thickness, and wherein the dimension of the throat is at least equal to the wall thickness dimension of one of the aluminum or steel or stainless steel conduits, and wherein the aluminum conduit is welded to the peripheral edge of the first aluminum layer, and the steel or stainless steel conduit is welded to the peripheral edge of the fourth steel or iron-chromium alloy layer.

2. A coupler as claimed in claim 1, and wherein the first thickness dimension of the first aluminum layer and the fourth layer of steel is about 0.5 inches.

3. A coupler as claimed in claim 2, and wherein the first thickness dimension of the second layer of aluminum is about 0.02 inches to about 0.06 inches.

4. A coupler as claimed in claim 3, and wherein the first thickness dimension of the third titanium layer is about 0.012 inches to about 0.06 inches.

* * * * *